United States Patent
Vasudevan et al.

(10) Patent No.: US 7,257,421 B2
(45) Date of Patent: Aug. 14, 2007

(54) METHOD AND APPARATUS FOR CONTROLLING A CELL RESELECTION MODE

(75) Inventors: Damodaran Vasudevan, Palatine, IL (US); Narender K. Jakher, Palatine, IL (US); Tushar Raval, Vernon Hills, IL (US)

(73) Assignee: Motorola, Inc., Schaumburg, IL (US)

( * ) Notice: Subject to any disclaimer, the term of this patent is extended or adjusted under 35 U.S.C. 154(b) by 345 days.

(21) Appl. No.: 10/796,326

(22) Filed: Mar. 9, 2004

(65) Prior Publication Data

US 2005/0107110 A1    May 19, 2005

Related U.S. Application Data

(60) Provisional application No. 60/519,874, filed on Nov. 13, 2003.

(51) Int. Cl.
    *H04Q 7/22*    (2006.01)
(52) U.S. Cl. .................. 455/525; 455/437; 455/435.1; 370/338

(58) Field of Classification Search ........ 455/436–444, 455/450–453, 525, 435.1, 67.11; 370/331–333, 370/342, 338
See application file for complete search history.

(56) References Cited

U.S. PATENT DOCUMENTS

| | | | |
|---|---|---|---|
| 6,542,742 B2 * | 4/2003 | Schramm et al. | ............ 455/436 |
| 6,647,262 B1 | 11/2003 | Demetrescu et al. | |
| 6,982,959 B1 * | 1/2006 | Salonaho et al. | ....... 455/437 X |
| 7,020,185 B1 * | 3/2006 | Balachandran et al. | . 375/332 X |
| 2002/0032032 A1 * | 3/2002 | Haumont et al. | ........... 455/436 |
| 2003/0125088 A1 | 7/2003 | Brigant et al. | |

* cited by examiner

*Primary Examiner*—Philip J. Sobutka
(74) *Attorney, Agent, or Firm*—Steven A. May

(57) ABSTRACT

A communication system controls a cell reselection mode of a mobile station while the mobile station resides in a cell by determining a cell reselection mode of the mobile station, determining whether the mobile station is experiencing a change in radio frequency (RF) conditions, and when the mobile station is experiencing a change in RF conditions, instructing the mobile station to change a cell reselection mode used by the mobile station.

6 Claims, 3 Drawing Sheets

METHOD AND APPARATUS FOR CONTROLLING A CELL RESELECTION MODE

REFERENCE(S) TO RELATED APPLICATION(S)

The present application claims priority from provisional application Ser. No. 60/519,874, entitled "Method and Apparatus for Controlling a Cell Reselection Mode," filed Nov. 13, 2003, which is commonly owned and incorporated herein by reference in its entirety.

FIELD OF THE INVENTION

The present invention relates generally to cellular communication systems, and, in particular, to cell reselection in a cellular communication system.

BACKGROUND OF THE INVENTION

The General Packet Radio Service (GPRS) standard provides a compatibility standard for cellular mobile telecommunications systems. The GPRS standard ensures that a mobile station (MS) operating in a GPRS system can obtain communication services when operating in a system manufactured according to the standard. To ensure compatibility, radio system parameters and call processing procedures are specified by the standard, including call processing steps that are executed by an MS and a network in order to provide for cell reselection.

FIG. 1 is a block diagram of an exemplary GPRS communication system 100 of the prior art. Communication system 100 includes multiple base transceiver stations (BTSs) 110, 112 that are each coupled to a Base Station Controller (BSC) 114. Each BTS 110, 112 provides communication services to a respective coverage area, or cell, serviced by the BTS. BSC 114 is further coupled to a Packet Control Unit (PCU) 116. PCU 116 is coupled to a Serving GPRS Support Node (SGSN) 118 that is, in turn, coupled to a Gateway GPRS Support Node (GGSN) 120, and via the GGSN, to an external network 130. BTSs 110 and 112, BSC 114, PCU 116, SGSN 118, and GGSN 120 are collectively referred to as a communication system network 122. Communication system 100 further includes an MS 102 that resides in a first cell and is provided communication services by a BTS 110 serving that cell. MS 102 and serving BTS 110 communicate via an air interface 104 comprising a downlink 105 and a uplink 106. Downlink 105 comprises multiple logical channels, including a broadcast channel, at least one traffic channel, and at least one control channel. Uplink 106 also comprises multiple logical channels, including an access channel, at least one traffic channel, and at least one control channel.

When MS 102 activates in communication system 100, the MS is conveyed a Neighbor List by the serving cell, that is, the cell associated serving BTS 110. Typically, the Neighbor List includes a list of multiple broadcast channels, typically 32 broadcast channels, associated with corresponding neighbor cells, such as a neighbor cell associated with BTS 112. MS 102 then monitors the listed broadcast channels.

In a typical GPRS communication system such as communication system 100, when MS 102 activates in, or roams into, the cell serviced by serving BTS 110, the MS is further is informed, via a Packet System Information (PSI) message transmitted by the BTS, of a cell reselection mode supported by the serving cell. In a GPRS communication system, the cell reselection mode may be any one of three modes. In a first cell reselection mode, NC0 (Network Control Order 0), cell reselection is autonomously performed by an MS based on a strength of a received downlink signal associated with the serving cell, that is, of a signal received by MS 102 from BTS 110 via downlink 105. In a second cell reselection mode, NC 1, cell reselection is autonomously performed by an MS based on a received signal strength of a signal received via a broadcast channel of the Neighbor List, such as a signal received by MS 102 from BTS 112 via a downlink 108 associated with BTS 112. In cell reselection mode NC1, the MS is further required to send measurement reports to the network. In a third cell reselection mode, NC2, cell reselection is controlled by a network, such as network 122. In the third cell reselection mode, an MS sends Packet Measurement Reports (PMRs) to the network, which PMRs include received signal strength measurements associated with the serving cell, such as the cell associated with serving BTS 110, and with multiple, typically six, broadcast channels of the Neighbor List. Based on the received PMRs, network 122 may then instruct MS 102 to perform a cell reselection.

In GPRS communication systems, the cell reselection mode supported by a cell is uniformly applied throughout the cell. That is, all MSs serviced by the cell, that is, by the BTS serving the cell, must use a same, fixed cell reselection mode. A result of the uniform application of a cell reselection procedure is a sub-optimal execution of cell reselections and unnecessarily congested air interfaces. For example, in cell reselection modes NC0 and NC1, an MS such as MS 102 is not aware of congestion level of a cell selected by the MS as a target cell. As a result, in cell reselection modes NC0 and NC1, an MS may request a handoff to a congested target cell with a result that the MS and other users actively engaged in a communication in the target cell experience degradation in a quality of their communications. This result is particularly undesirable when the MS may have been experiencing acceptable conditions in its current cell. By way of another example, cell reselection modes NC1 and NC2 require an MS, such as MS 102, to periodically transmit measurement reports to a network, such as network 122. When the channel conditions experienced by MS 102 are consistently of acceptable quality, the periodic measurement reports transmitted by the MS are, in essence, redundant and are of no use to the network. As a result, when the cell serviced by a BTS, such as BTS 110, includes a large number of MSs, air interface 104, and in particular uplink 106, may become congested with redundant measurement reports that are of little, if any, value to the network. This is of particular importance in light of the fact that over-the-air bandwidth is often a constraining factor in system performance.

Therefore, a need exists for a method and apparatus that optimizes an application of cell reselection modes in a cell.

DETAILED DESCRIPTION OF THE INVENTION

To address the need for a method and apparatus that optimizes an application of cell reselection modes in a cell, a communication system is provided that controls a cell reselection mode of a mobile station while the mobile station resides in a cell by determining a cell reselection mode of the mobile station, determining whether the mobile station is experiencing a change in radio frequency (RF) conditions, and when the mobile station is experiencing a change in RF conditions, instructing the mobile station to change a cell reselection mode used by the mobile station.

Generally, an embodiment of the present invention encompasses a method for controlling a cell reselection mode of a mobile station while the mobile station resides in a cell. The method includes determining a cell reselection mode of the mobile station, determining whether the mobile station is experiencing a change in radio frequency (RF) conditions, and when the mobile station is experiencing a change in RF conditions, instructing the mobile station to change a cell reselection mode used by the mobile station.

Another embodiment of the present invention encompasses a network controller comprising at least one memory device that stores a default cell reselection mode associated with a cell serviced by the network controller. The network controller further comprises a processor coupled to the at least one memory device that determines a cell reselection mode of a mobile station located in the cell, determines whether the mobile station is experiencing a change in radio frequency (RF) conditions, and when the mobile station is experiencing a change in RF conditions, instructs the mobile station to change a cell reselection mode.

Figure 1:
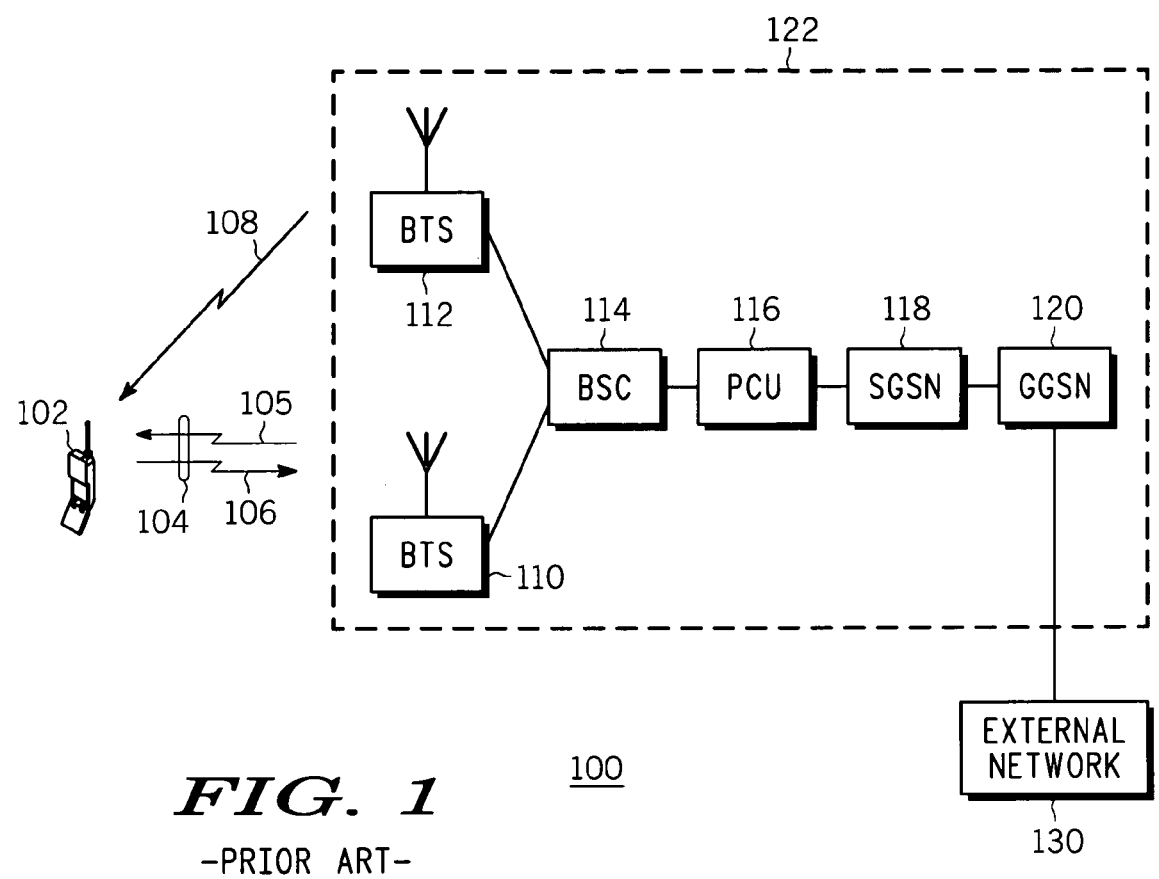
FIG. 1 is a block diagram of a wireless communication system of the prior art.
Figure 2:
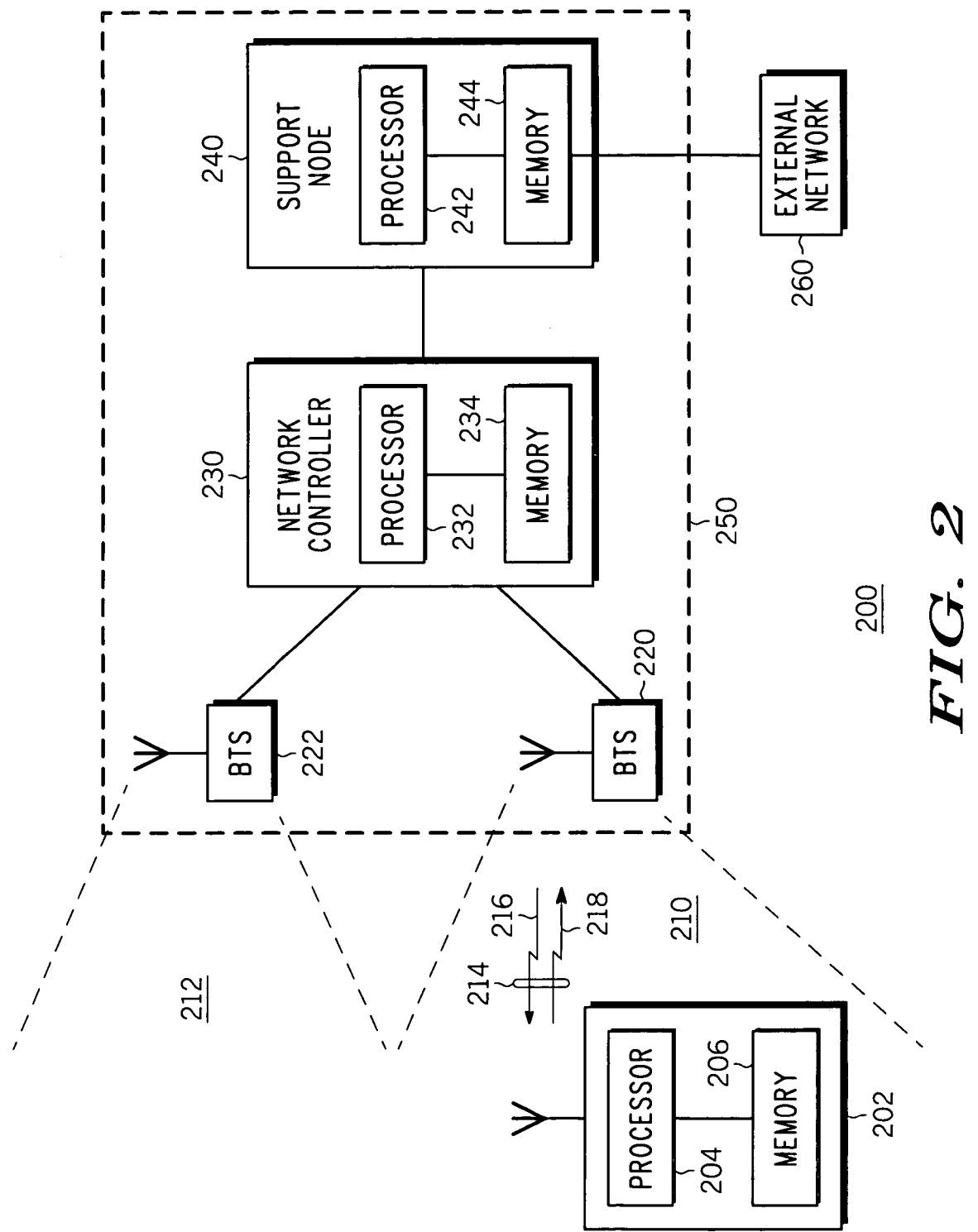
FIG. 2 is a block diagram of a wireless communication system in accordance with an embodiment of the present invention.

The present invention may be more fully described with reference to FIGS. 2-3. FIG. 2 is a block diagram of a wireless communication system 200 in accordance with an embodiment of the present invention. Communication system 200 includes multiple transceivers 220, 222 (two shown), such as Base Transceiver Stations (BTSs), that are each operably coupled to a network controller 230. Network controller 230 may comprise one or more of a Base Station Controller (BSC), a Packet Control Unit (PCU), and a Packet Control Function (PCF) and the functions of network controller 230 may be implemented in any one of such elements or may be distributed among such elements. In other embodiments of the present invention, each BTS 220, 222 may be coupled to a separate network controller, or may share some elements of the network controller, such as a PCU, and be separately coupled to other elements of the network controller, such as BSCs. Each BTS 220, 222 provides wireless communication services to mobile stations (MSs) located in a respective coverage area, or cell, 210, 212 associated with the BTS.

Communication system 200 further includes at least one mobile station (MS) 202 that is provided communication services by a source BTS, that is, BTS 220, that services a cell 210 in which the MS resides. MS 202 and BTS 220 communicate via an air interface 214 comprising a downlink 216 and an uplink 218. Downlink 216 comprises multiple logical channels, including at least one broadcast channel, at least one traffic channel, and at least one control channel. Uplink 218 also comprises multiple logical channels, including an access channel, at least one traffic channel, and at least one control channel.

Communication system 200 further includes a Support Node 240 coupled to network controller 230. Support Node 240 typically includes one or more Serving GPRS Support Nodes (SGSNs) that are each coupled to one or more Gateway GPRS Support Nodes (GGSNs). However, the precise architecture of Support Node 240 is up to an operator of communication system 200 and is not critical to the present invention. Together, the multiple BTSs 220, 222, network controller 230, and Support Node 240 are collectively referred to herein as a communication system network 250.

Each of MS 202, network controller 230, and Support Node 240 includes a respective processor 204, 232, 242, operably coupled to, or associated with, a respective at least one memory device 206, 234, 244. Each of processors 204, 232, and 242 comprises one or more microprocessors, microcontrollers, digital signal processors (DSPs), combinations thereof or such other devices known to those having ordinary skill in the art. Each of the at least one memory devices 206, 234, and 244 comprises one or more memory devices such as a random access memory (RAM), a dynamic random access memory (DRAM), and/or a read only memory (ROM) or equivalents thereof, that stores data and programs that may be executed by the corresponding processor.

Network controller 230 maintains a record, in the at least one memory device 234, of each MS active in communication system 200 and serviced by the network controller. Preferably, network controller 230 maintains the records of active MS's by storing an MS identifier uniquely associated with each such active MS. Network controller 230 further maintains a record in memory device 234 and in association with each cell and associated BTS, such as cell 210 and BTS 220, of a default cell reselection mode associated with the cell and BTS. Support Node 240 maintains, in the at least one memory device 244 of the Support Node, a record of Neighbor List associated with each MS serviced by the Support Node.

Communication system 200 comprises a wireless packet data communication system. In order for MS 202 to establish a packet data connection with an external network 260, each of MS 202, BTSs 220 and 222, network controller 230, and SGSN 240 operates in accordance with the General Packet Radio Service (GPRS) standard, and in particular with 3GPP (Third Generation Partnership Project) TS (Technical Specification) 04.60 version 8.9.0, TS 05.02, version 8.10.0, and 3GPP TS 05.08 version 8.18.0, which standards are hereby incorporated by reference herein and copies of which may be obtained from the 3GPP via the Internet or from the 3GPP Organization Partners' Publications Offices at Mobile Competence Centre 650, route des Lucioles, 06921 Sophia-Antipolis Cedex, France. The GPRS standards specify wireless telecommunications system operating protocols, including radio system parameters and call processing and handoff procedures, for GPRS communication systems. By operating in accordance with the GPRS standard, a user of MS 202 can be assured that MS 202 will be able to communicate with communication system network 250 and establish a packet data communication link with an external network, such as network 260, via communication system network 250.

GPRS communication systems, such as communication system 200, use a combination of frequency and time division multiplexing to define a physical channel, with the result that a physical channel is defined as a sequence of radio frequency channels and timeslots. The physical channel comprises multiple logical channels, wherein each logical channel comprises a portion of the physical channel, such as a portion of a timeslot, a timeslot, or multiple timeslots, that is allocated for conveyance of control or traffic data. Typically, a radio frequency channel comprises eight time slots, which eight time slots constitute a frame. A 52-mulitframe, comprising 52 frames, is typically used to support packet data traffic and associated control channels and a 51-multiframe, comprising 51 frames, is typically used to support broadcast and common control channels.

When MS 202 activates in communication system 200, Support Node 240 assembles and conveys to the MS a Neighbor List comprising logical channels associated with neighboring cells, such as cell 212 serviced BTS 222, that are potential handoff or reselection candidates for MS 202. Typically, the Neighbor List comprises a list of broadcast channels (BCCH) associated with each cell of multiple neighbor cells, such as a broadcast channel associated with neighbor cell 212 and neighbor BTS 222. Upon receiving the Neighbor List, MS 202 stores the Neighbor List in the at least one memory device 206 of the MS. In order to determine whether to engage in a cell reselection, MS 202 monitors a downlink signal, typically a pilot signal, of each broadcast channel identified in the Neighbor List and determines a signal quality metric, such as a signal strength, a signal-to-noise ratio (SNR), or a bit error rate (BER), with respect to each monitored signal. MS 202 further determines a signal quality metric with respect to signals received from serving BTS 220.

In addition, BTS 220 broadcasts system operating parameters in Packet System Information (PSI) messages via a broadcast channel of downlink 216. PSI messages are described in detail in 3GPP TS 05.02. Among the system operating parameters included in the PSI messages is a cell reselection mode supported by cell 210 and associated BTS 220. The cell reselection mode may be any one of multiple modes. For example, a first cell reselection mode, NC0 (Network Control Order 0), provides for an autonomous cell reselection by an MS based on a signal quality metric determined by the MS with respect to a downlink signal associated with serving cell 210, that is, with a signal transmitted by BTS 220. By way of another example, a second cell reselection mode, NC1, provides for an autonomous cell reselection by an MS based on signal quality metric determined by the MS with respect to a broadcast channel of the Neighbor List, such as a downlink signal associated with cell 212 and transmitted by BTS 222. In cell reselection mode NC1, the MS is further required to send measurement reports to network 250. By way of yet another example, a third cell reselection mode, NC3, provides for a network-controlled cell reselection based on signal quality metrics determined by an MS, such as MS 202, with respect to a serving cell 210 and an associated BTS 220 and further with respect to at least one broadcast channel of the Neighbor List, such as a downlink signal associated with neighbor cell 212 and transmitted by neighbor BTS 222. The MS conveys the signal quality metrics to network 250, and in particular to network controller 230. For example, MS 202 may convey the signal quality metrics to network 250 in a format of a Packet Measurement Report (PMR). Based on the received signal quality metrics, network 250 then instructs the MS to perform a cell reselection.

In the prior art, each cell in a communication system, such as a cell serviced by BTS 110, uniformly applies a cell reselection mode to all MSs serviced by the cell. A result of the uniform application of a cell reselection mode may be an inappropriate execution of cell reselection and a congested air interface. In order to overcome these problems, communication system 200 provides for dynamic, intra-cell adjustment of a cell reselection mode on an MS-by-MS basis.

Figure 3:
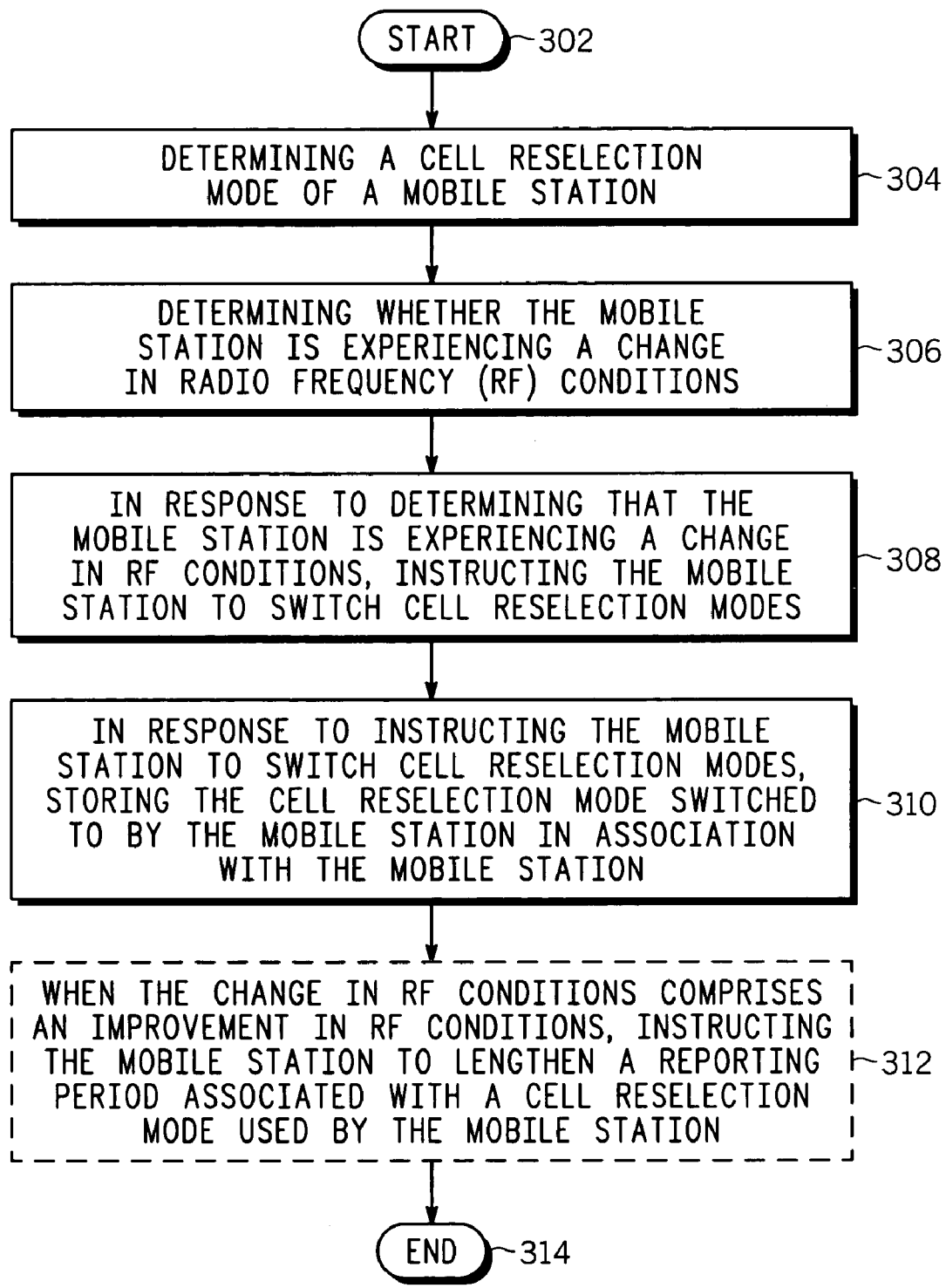
FIG. 3 is a logic flow diagram of a method by which the communication system of FIG. 2 executes a dynamic, intra-cell adjustment of a cell reselection mode in accordance with various embodiments of the present invention.

FIG. 3 is a logic flow diagram 300 of a method by which communication system 200 executes a dynamic, intra-cell adjustment of a cell reselection mode in accordance with various embodiments of the present invention. Logic flow diagram 300 begins (302) when network 250, and in particular network controller 230, determines (304) a cell selection mode used by an MS, such as MS 202, serviced by the controller. In one embodiment of the invention, when MS 202 activates in, or roams into, a cell serviced by controller 230, such as cell 210, network controller 230 instructs the MS 202 to use a default cell selection mode for the cell. Network controller 230 further stores the MS's cell reselection mode in association with the MS, such as in association with tan MS identifier uniquely associated with the MS, in the at least one memory device 234 of the network controller. Step 304 then comprises determining the default cell reselection mode of the cell.

For example, when MS 202 activates in cell 210 or roams into cell 210, network controller 230 may instruct the MS to use an autonomous cell reselection mode, such as an NC0 mode or an NC1 mode, or may instruct the MS to use a network-controlled cell reselection mode, such as an NC2 mode. The default cell reselection mode associated with any particular cell, and a corresponding BTS serving the cell, is up to a designer of system 200 and is not critical to the present invention. As noted above, such an instruction is typically conveyed via a PSI message that is broadcast via a broadcast channel of downlink 216.

In another embodiment of the present invention, MS 202 may have already adopted a cell reselection mode pursuant to an earlier instruction received from network controller 230 via serving BTS 220. In such an embodiment, step 304 may comprise network controller 230 determining a current cell reselection mode of the MS by reference to the at least one memory device 234 of the network controller. Unless otherwise specified herein, the functions performed herein by network controller 230 are performed by processor 232 of the network controller, and the functions performed herein by network 250 are performed by network controller 230. Also, unless otherwise specified herein, the functions performed herein by MS 202 are performed by processor 204 of the MS.

In response to determining a cell reselection mode of the MS, that is, MS 202, network 250, and in particular network controller 230, determines (306) whether the MS is experiencing a change in radio frequency (RF) conditions. When network 250, and in particular network controller 230, determines that the MS is experiencing a change in RF conditions, the network, and in particular the network controller, instructs (308) the MS to switch cell reselection modes. In response to instructing MS 202 to change cell reselection modes, network 250 stores (310) the new cell reselection mode used by the MS in association with the MS in the at least one memory device 234 of network controller 230 and logic flow 300 then ends (314).

In one embodiment of the present invention, step 306 may comprise a determination that an MS in an autonomous cell reselection mode, such as NC0 or NC1, has experienced a deterioration of RF conditions. In response to determining that the MS has experienced a deterioration of RF conditions, step 308 then comprises network controller instructing the MS to change to a network-controlled cell reselection mode, such as NC2.

In one "deteriorating conditions" embodiment of the present invention, a determination that MS 202 has experienced a deterioration in RF conditions may be based on an evaluation of downlink signals received by MS 202 from serving BTS 220. For example, in one "downlink signal based" embodiment, while serviced by serving BTS 220, MS 202 monitors downlink signals received by the MS from serving BTS 220 and from cells associated with the Neighbor List, such as cell 212 and associated BTS 222, typically signals received via broadcast channels included in the Neighbor List. MS 202 determines a downlink signal quality metric with respect to each monitored downlink signal. Preferably, the downlink signal quality metric comprises a received signal level (Rxlev); however those who are of ordinary skill in the art realize that any signal quality metric, such as a bit error rate (BER) or a signal-to-noise ratio (SNR), may be used herein without departing from the spirit and scope of the present invention. MS 202 then conveys the downlink signal quality metrics to network 250, and in particular to network controller 230. For example, the downlink signal quality metrics may be conveyed by MS 202 to network 250 in Packet Measurement Reports (PMRs). Based on the received downlink signal quality metrics, network controller 230 determines whether MS 202 is experiencing deteriorating RF conditions in serving cell 210. For example, network controller 230 may compare one or more received downlink signal quality metrics associated with a logical channel associated with MS 202 and serving BTS 220 to a downlink signal quality metric threshold. When MS 202 is in an autonomous cell reselection mode and one or more received signal quality metrics compare unfavorably with the threshold, for example, falls below a received signal strength (Rxlev) threshold or an SNR threshold, then network controller 230 may determine that MS 202 is experiencing deteriorating RF conditions.

By way of another example, in another "downlink signal based" embodiment, MS 202 determines downlink signal quality metrics such as such as C2I blur and block error rate based on downlink signals received by the MS. MS 202 conveys these downlink signal quality metrics to network 250, and in particular network controller 230, via serving BTS 220 in a Packet Measurement Report (PMR). Based on the downlink signal quality metrics received from MS 202, network controller 230 determines a channel coding scheme that MS 202 shall use when transmitting on uplink 218. For example, TS 04.06, Sections 11.2.28 and 11.2.29, provides four coding schemes CS-1, CS-2, CS-3, and CS-4 that the MS may be instructed to use. When MS 202 is in an autonomous cell reselection mode and the determined coding scheme involves a downgrade of a current coding scheme, for example a downgrade of a coding scheme from CS-4 to CS-2 or CS-1, then network controller 230 may determine that the MS is experiencing deteriorating RF conditions.

In another "deteriorating conditions" embodiment of the present invention, a determination that MS 202 has experienced a deterioration in RF conditions may be based on an evaluation of uplink signals received from MS 202. For example, network 250 may monitor access messages conveyed by MS 202 to the network via serving BTS 220 and an access channel of uplink 218. Access messages are advantageous to measure because MSs typically transmit access messages at full power. However, the monitored message is up to a designer of communication system 200 and can be any uplink message that permits a determination by a receiving network of a degradation in an RF condition of an MS.

Based on the monitored signals, network 250, and in particular network controller 230, determines whether MS 202 is experiencing deteriorating RF conditions in serving cell 210. For example, in one embodiment of the present invention, network 250, and in particular network controller 230, may determine an uplink signal quality metric with respect to each received uplink signal. Network controller 230 compares the determined uplink signal quality metrics to an uplink signal quality metric threshold. When the one or more uplink signal quality metrics compare unfavorably with the threshold, for example, falls below a received signal strength (Rxlev) threshold or falls below an SNR threshold, then network controller 230 determines that MS 202 is experiencing deteriorating RF conditions.

When MS 202 is in an autonomous cell reselection mode and network controller 230 determines that the MS is experiencing deteriorating RF conditions, step 308 then comprises network controller instructing MS 202 to change cell reselection modes to a network-controlled mode, such as NC2. Network controller 230 may instruct MS 202 to switch cell reselection modes by conveying to the MS a 'change cell reselection mode' instruction, such as by embedding the instruction in a Packet Measurement Order (PMO) message that has been modified to include a change cell reselection mode data field in which the instruction is embedded. By instructing the MS to switch to a network-controlled cell reselection mode, network 250 may prevent an MS likely to engage in a cell reselection from reselecting a congested cell and may further prevent the MS from engaging in multiple cell reselections in a short period of time, which multiple cell reselections may reduce overall throughput for the MS.

In addition, to prevent MS 202 from bouncing back and forth among cell reselection modes, step 306 may further include an evaluation period. That is, the determination that MS 202 is experiencing deteriorating RF conditions may be based on signal quality metrics that consistently compare unfavorably with an associated signal quality metric threshold over a predetermined period of time. Or a determination that MS 202 is experiencing deteriorating RF conditions may be based on a coding scheme associated with MS 202 changing and then remaining at the changed level, such as CS-1 or CS-2, for a predetermined period of time.

In another embodiment of the present invention, an "improving conditions" embodiment, step 306 may comprise a determination that an MS in a network-controlled cell reselection mode, such as NC2, has experienced an improvement of RF conditions. In response to determining that the MS has experienced an improvement of RF conditions, step 308 then comprises network controller 230 instructing the MS to change to an autonomous cell reselection mode, such as NC0 or NC1. In addition, when the autonomous cell reselection mode requires periodic reporting by the MS of RF conditions experienced by the MS, such as cell reselection mode NC1, network controller 230 may further instruct (312) the MS to convey the reports less often, that is, to increase or lengthen the reporting period, and thereby lessen uplink 218 congestion, or the network controller may further instruct the MS to switch to a cell reselection mode, that is, NC0, that does not require measurement reports.

Similar to the "deteriorating conditions" embodiments of the present invention, in one an "improving conditions" embodiment of the present invention a determination that MS 202 has experienced an improvement in RF conditions may be based on an evaluation of downlink signals received by MS 202 from serving BTS 220. That is, while serviced by serving BTS 220, MS 202 monitors downlink signals received by the MS from serving BTS 220 and from cells associated with the Neighbor List, such as cell 212 and associated BTS 222. MS 202 determines a downlink signal quality metric with respect to each monitored downlink signal and conveys the downlink signal quality metrics to network 250, and in particular to network controller 230. Based on the received downlink signal quality metrics, network controller 230 determines whether MS 202 is experiencing improved RF conditions in serving cell 210.

In one embodiment of the present invention, when MS 202 is in a network-controlled cell reselection mode, such as NC2, and network controller 230 determines that the MS is experiencing improved RF conditions, step 308 may then comprise network controller instructing MS 202 to change cell reselection modes to an autonomous mode, such as NC1 or NC0. In another embodiment of the present invention, when MS 202 is in an autonomous cell reselection mode that required s reporting, such as NC1, and network controller 230 determines that the MS is experiencing improved RF conditions, step 308 may then comprise network controller instructing MS 202 to change cell reselection modes to an autonomous mode that does not require reporting, such as NC0. Network controller 230 may instruct MS 202 to switch cell reselection modes by conveying to the MS the 'change cell reselection mode' instruction, such as by embedding the instruction in a Packet Measurement Order (PMO) message that has been modified to include a change cell reselection mode data field in which the instruction is embedded.

In one embodiment of the present invention, network controller 230 may determine whether MS 202 is experiencing improved RF conditions as follows. Network controller 230 compares one or more received downlink signal quality metrics associated with a logical channel associated with MS 202 and serving BTS 220 to a downlink signal quality metric threshold. When the one or more received downlink signal quality metrics compare favorably with the threshold, for example, exceeds a received signal strength (Rxlev) threshold or an SNR threshold, then network controller 230 determines that MS 202 is experiencing improved RF conditions. In another embodiment of the present invention, network controller 230 may determine whether MS 202 is experiencing improved RF conditions as follows. Based on downlink signal quality metrics received from MS 202, such as C2I blur and block error rate, network controller 230 determines a channel coding scheme, such as coding schemes CS-1, CS-2, CS-3, and CS-4, that MS 202 shall use when transmitting on uplink 218. When the determined coding scheme involves an upgrade of a current coding scheme, for example an upgrade of a coding scheme from CS-1 to CS-2 or CS-2 to CS-3, then network controller 230 determines that the MS is experiencing improved RF conditions.

In another embodiment of the present invention, a determination that MS 202 has experienced an improvement in RF conditions may be based on an evaluation of uplink signals received from MS 202. Again, network controller 230 may monitor uplink signals received from MS 22 via uplink 218 and serving BTS 220. Based on the monitored signals, network 250, and in particular network controller 230, determines whether MS 202 is experiencing improved RF conditions in serving cell 210. For example, network 250, and in particular network controller 230, may determine an uplink signal quality metric with respect to each received uplink signal and compare the determined signal quality metrics to an uplink signal quality metric threshold. When the one or more uplink signal quality metrics compares favorably with the threshold, for example, exceeds a received signal strength (Rxlev) threshold or an SNR threshold, then network controller 230 determines that MS 202 is experiencing improved RF conditions.

When MS 202 is in a network-controlled cell reselection mode, such as NC2, in response to determining that MS 202 is experiencing improved RF conditions, network controller 230 may then instruct MS 202 to change cell reselection modes to an autonomous mode, such as NC0 or NC1. In another embodiment of the present invention, when MS 202 is in an autonomous cell reselection mode that requires reporting, such as NC1, in response to determining that MS 202 is experiencing improved RF conditions, network controller 230 may then instruct MS 202 to change cell reselection modes to an autonomous mode that does not require reporting, such as NC0. By switching MS 202 to an autonomous cell reselection mode when RF conditions are improved, network 250 is permitting the MS to operate in an autonomous cell reselection mode in a situation where there is a reduced likelihood of the MS engaging in multiple cell reselections in a short period of time. Furthermore, by switching MS 202 to an autonomous cell reselection mode that does not require reporting when RF conditions are improved, network 250 reduces a number of redundant measurement reports conveyed by the MS to the network that will each merely confirm the improved RF conditions and will provide little information that is of use to the network.

Also, to prevent MS 202 from bouncing back and forth among cell reselection modes, step 306 involving determining whether MS 202 is experiencing a change in RF conditions may further include an evaluation period. That is, one embodiment of the present invention, the determination that MS 202 is experiencing deteriorating or improved RF conditions may be based on signal quality metrics that consistently compare unfavorably or favorably, whichever is appropriate, with the appropriate signal quality metric threshold over an evaluation period, that is, a predetermined period of time. In another embodiment of the present invention, the determination that MS 202 is experiencing deteriorating or improved RF conditions may be based on a coding scheme change that persists over an evaluation period.

By changing a cell reselection mode used by MS 202 based on a change in RF conditions experienced by the MS, communication system 200 is able to reduce a likelihood that an MS will execute an undesirable cell reselection to a congested cell and is further able to minimize air interface congestion that results from conveyance, by the MS, of redundant measurement reports that are of little, if any, value to the network. For example, when network 250 determines an improvement in RF conditions and the MS is using a network-controlled cell reselection mode, the network may instruct the MS to switch to an autonomous cell reselection mode, such as NC0 and NC1, or to an autonomous cell reselection mode, such as NC0, that does not require reporting by the MS. By way of another example, when network 250 determines a deterioration in RF conditions and the MS is using an autonomous cell reselection mode, the network may instruct the MS to switch to network-controlled cell reselection mode, such as NC 2.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for controlling a cell reselection mode of a mobile station while the mobile station resides in a cell comprising:
    determining a cell reselection mode of the mobile station, wherein the cell reselection mode comprises one or more of (i) whether a cell reselection will be autonomous or network-controlled and (ii) the reporting requirements of the mobile station;
    determining a signal quality metric associated with a downlinik signal;
    determining an uplink coding scheme based the signal quality metric;
    determining whether the mobile station is experiencing a change in radio frequency conditions based on the determined uplink coding scheme; and
    when the mobile station is experiencing a change in radio frequency conditions, instructing the mobile station to change a cell reselection mode used by the mobile station.

2. A method for controlling a cell reselection mode of a mobile station while the mobile station resides in a cell comprising:
    determining a cell reselection mode of the mobile station, wherein the cell reselection mode comprises one or more of (i) whether a cell reselection will be autonomous or network-controlled and (ii) the reporting requirements of the mobile station;
    determining a signal quality metric associated with an uplink signal;
    determining an uplink coding scheme based on the signal quality metric;
    determining whether the mobile station is experiencing a change in radio frequency conditions based on the determined uplink coding scheme; and
    when the mobile station is experiencing a change in radio frequency conditions, instructing the mobile station to change a cell reselection mode used by the mobile station.

3. A network controller comprising:
    at least one memory device that stores a default cell reselection mode associated with a cell serviced by the network controller; and
    a processor coupled to the at least one memory device that determines a cell reselection mode of a mobile station located in the cell, wherein the cell reselection mode comprises one or more of (i) whether a cell reselection will be autonomous or network-controlled and (ii) the reporting requirements of the mobile station, determines a signal quality metric associated with a downlinik signal, determines an uplink coding scheme based the signal quality metric, determines whether the mobile station is experiencing a change in radio frequency conditions based on the determined uplink coding scheme, and when the mobile station is experiencing a change in radio frequency conditions, instructs the mobile station to change a cell reselection mode.

4. The network controller of claim 3, wherein the network controller comprises at least one of a Base Station Controller, a Packet Control Unit, and a Packet Control Function.

5. A network controller comprising:
    at least one memory device that stores a default cell reselection mode associated with a cell serviced by the network controller; and
    a processor coupled to the at least one memory device that determines a cell reselection mode of a mobile station located in the cell, wherein the cell reselection mode comprises one or more of (i) whether a cell reselection will be autonomous or network-controlled and (ii) the reporting requirements of the mobile station, evaluates an uplink signal quality metric associated with an uplink signal, determines an uplink coding scheme based on the uplink signal quality metric, determines whether the mobile station is experiencing a change in radio frequency conditions based on the determined uplink coding scheme, and when the mobile station is experiencing a change in radio frequency conditions, instructs the mobile station to change a cell reselection mode.

6. The network controller of claim 5, wherein the network controller comprises at least one of a Base Station Controller, a Packet Control Unit, and a Packet Control Function.

* * * * *